United States Patent
Cho et al.

(10) Patent No.: US 10,247,980 B2
(45) Date of Patent: Apr. 2, 2019

(54) FILM FOR ENHANCING COLOR PURITY AND CORRECTING BRIGHTNESS FOR LIQUID CRYSTAL DISPLAY DEVICE, AND LIQUID CRYSTAL DISPLAY DEVICE COMPRISING SAME

(71) Applicant: SKC HI-TECH & MARKETING CO., LTD., Chungcheongnam-do (KR)

(72) Inventors: Hong Youl Cho, Chungcheongnam-do (KR); Kyoo Choong Cho, Gyeonggi-do (KR); Hyun Cheol Nam, Chungcheongnam-do (KR)

(73) Assignee: SKC HI-TECH & MARKETING CO., LTD., Chungcheongnam-Do (KR)

( * ) Notice: Subject to any disclaimer, the term of this patent is extended or adjusted under 35 U.S.C. 154(b) by 0 days.

(21) Appl. No.: 15/523,095

(22) PCT Filed: Mar. 30, 2015

(86) PCT No.: PCT/KR2015/003120
§ 371 (c)(1),
(2) Date: Apr. 28, 2017

(87) PCT Pub. No.: WO2016/068409
PCT Pub. Date: May 6, 2016

(65) Prior Publication Data
US 2017/0329179 A1    Nov. 16, 2017

(30) Foreign Application Priority Data
Oct. 31, 2014 (KR) .......... 10-2014-0150137

(51) Int. Cl.
*G02F 1/1335* (2006.01)
*G02F 1/135* (2006.01)

(52) U.S. Cl.
CPC ........ *G02F 1/133528* (2013.01); *G02F 1/135* (2013.01); *G02F 1/133609* (2013.01);
(Continued)

(58) Field of Classification Search
CPC ......... G02F 1/133528; G02F 1/133617; G02F 1/135; G02F 1/1351; G02F 1/133609; Y10T 428/1041
See application file for complete search history.

(56) References Cited

U.S. PATENT DOCUMENTS

2007/0172649 A1 * 7/2007 Aihara ................ C09J 7/021
428/343
2010/0157205 A1 * 6/2010 Kiya .................. G02B 5/3033
349/96
(Continued)

FOREIGN PATENT DOCUMENTS

JP    2006-076240       3/2006  ............ B32B 27/30
JP    2006076240 A  *  3/2006
(Continued)

OTHER PUBLICATIONS

Color, Wikipedia, Nov. 28, 2017 [Online] [retrieved on Dec. 25, 2017]. Retrieved from the Internet: <URL: https://en.wikipedia.org/wiki/Color>.*

(Continued)

*Primary Examiner* — Sophie Hon
(74) *Attorney, Agent, or Firm* — Harness, Dickey & Pierce, P.L.C.

(57) ABSTRACT

The present invention relates to a film capable of enhancing color purity and correcting brightness for a liquid crystal display device, and a liquid crystal display device comprising the same, and can provide a liquid crystal display device having enhanced color gamut and color purity by introducing, to the inside of an adhesive layer or a coating layer of
(Continued)

the liquid crystal display device, a combination of an absorption dye for absorbing a specific wavelength band and a fluorescent dye absorbing a specific wavelength band and emitting light, thereby blocking unnecessary wavelengths except for RGB wavelengths.

8 Claims, 10 Drawing Sheets

(52) U.S. Cl.
CPC ............ *G02F 1/133617* (2013.01); *G02F 2001/1351* (2013.01); *G02F 2001/133624* (2013.01); *Y10T 428/1041* (2015.01)

(56) References Cited

U.S. PATENT DOCUMENTS

| | | | | |
|---|---|---|---|---|
| 2013/0062648 | A1* | 3/2013 | Nishimura | H01L 33/504 257/98 |
| 2013/0147345 | A1* | 6/2013 | Maeda | C09B 23/0066 313/503 |

FOREIGN PATENT DOCUMENTS

| | | | | |
|---|---|---|---|---|
| JP | 2008-133443 | | 6/2008 | ............ C08L 101/00 |
| JP | 2008133443 A | * | 6/2008 | ........... G02B 5/0242 |
| JP | 2009-251511 | | 10/2009 | ............... G02B 5/22 |
| JP | 2010-134349 | | 6/2010 | ........... G02F 1/1335 |
| JP | 2011-039093 | | 2/2011 | ......... G02F 1/13357 |
| JP | 2011039093 A | * | 2/2011 | |
| JP | 2011-119131 | | 6/2011 | ................ F21S 2/00 |
| JP | 2011119131 A | * | 6/2011 | |
| KR | 10-2005-0065830 | | 6/2005 | ......... G02F 1/13357 |
| KR | 10-2010-0090056 | | 8/2010 | ............... B32B 7/02 |

OTHER PUBLICATIONS

Office Action dated Jun. 21, 2016 in Japanese Application No. JP 2015-132096 with English Translation.
Office Action dated Oct. 21, 2015 in Korean Application No. KR1020140150137 with English Translation.
Office Action dated Sep. 30, 2015 in Korean Application No. KR1020140150137 with English Translation.
International Search Report (ISR) dated Jul. 7, 2015 in PCT/KR2015/003120 published as WO 2016/068409 with English Translation.
Written Opinion (WO) dated Jul. 7, 2015 in PCT/KR2015/003120 published as WO 2016/068409 (no English translation available).

* cited by examiner

FILM FOR ENHANCING COLOR PURITY AND CORRECTING BRIGHTNESS FOR LIQUID CRYSTAL DISPLAY DEVICE, AND LIQUID CRYSTAL DISPLAY DEVICE COMPRISING SAME

CROSS-REFERENCE TO RELATED APPLICATIONS

This application is a national phase application of PCT Application No. PCT/KR2015/003120, filed on Mar. 30, 2015, which claims the benefit and priority of Korean Patent Application No. 10-2014-0150137, filed Oct. 31, 2014. The entire disclosures of the applications identified in this paragraph are incorporated herein by reference.

FIELD

The present invention relates to a color gamut enhancing and brightness compensating film for a liquid crystal display, and a liquid crystal display comprising same.

BACKGROUND

In the past, 40-inch (″) class TVs were mainstream products, but many consumers now buy 50″ class TVs and even 60″ class TVs. When the size competition was over, resolution competition began. Even a year ago, full high definition (HD) (FHD) class TVs belonged to an advanced model, but ultra HD (UHD) TVs now have been rapidly spread on the market.

Recently, the display market has evolved from large-area, high-resolution competition to color competition. For this reason, competition for the production of a display with excellent color has recently emerged.

A liquid crystal display (LCD) displays an image using optical properties of liquid crystals, wherein, since a liquid crystal panel displaying the image is a non-emissive device which is not self-luminous, the liquid crystal display has a structure including the liquid crystal panel as well as a back-light unit which is disposed on a rear surface of the liquid crystal panel to provide light to the liquid crystal panel.

A liquid crystal display has advantages of a small thickness, a light weight, a small consuming power and a low driving voltage when compared to other displays. On the contrary, the liquid crystal display is one step behind the other displays in the sense of color. The color reproduction range of a CRT which is now disappearing amounts to NTSC 80%, and a PDP that has been released recently can achieve the level of NTSC 90%. In addition, an OLED which receives much attention as a next-generation display, may attain up to NTSC 100%. However, an LCD TV may attain at most NTSC 72%.

Accordingly, there is a need to solve the limitations of the LCD to survive in the depressed display market.

In particular, it is required in the field to develop a technology for improving the color gamut of the conventional LCD, and a new technology for compensating brightness decrease, which may be accompanied by the improvement of the color gamut.

SUMMARY

Thus, an object of the present invention is to provide a film which may enhance color gamut and compensate brightness decrease in a liquid crystal display by transmitting pure RGB wavelengths emitted from a light source as much as possible and blocking unnecessary wavelengths other than the RGB wavelengths, and a liquid crystal display comprising same.

To achieve the above object, the present invention provides a liquid crystal display comprising a backlight unit and a liquid crystal panel, wherein the backlight unit, the liquid crystal panel, or both comprise one or more coating layers or adhesive layers, and wherein the one or more coating layers or adhesive layers comprise at least one type of an absorption dye configured to absorb a specific wavelength band, and at least one type of a fluorescent dye configured to absorb and emit a specific wavelength band, in such a manner that both the absorption dye and the fluorescent dye are comprised in the same layer, or each of the absorption dye and the fluorescent dye is comprised in a different layer, respectively, in the one or more coating layers or adhesive layers.

In addition, the present invention provides a color gamut enhancing and brightness compensating film for a liquid crystal display, comprising a pressure-sensitive adhesive, at least one type of an absorption dye configured to absorb a specific wavelength band, and at least one type of a fluorescent dye configured to absorb and emit a specific wavelength band.

In addition, the present invention also provides a color gamut enhancing and brightness compensating film for a liquid crystal display, comprising a binder resin, at least one type of an absorption dye configured to absorb a specific wavelength band, and at least one type of a fluorescent dye configured to absorb and emit a specific wavelength band.

According to the present invention, by using a color gamut enhancing film for a liquid crystal display, which is formed by introducing a combination of absorption dyes configured to absorb a specific wavelength band and a combination of fluorescent dyes configured to absorb and emit a specific wavelength band into an adhesive layer or a coating layer of a liquid crystal display, a color gamut may be enhanced by transmitting pure RGB wavelengths emitted from a light source as much as possible and blocking unnecessary wavelengths other than the RGB wavelengths and a brightness decrease that may be accompanied thereby may be compensated, and thus, a liquid crystal display having the improved color gamut and brightness may be manufactured. In addition, the color gamut enhancing and brightness compensating film according to the present invention may maximize color gamut enhancing effect and brightness compensation effect by freely moving the position thereof according to the characteristics of a display.

<Explanation of Reference Marks>

Figure 1:
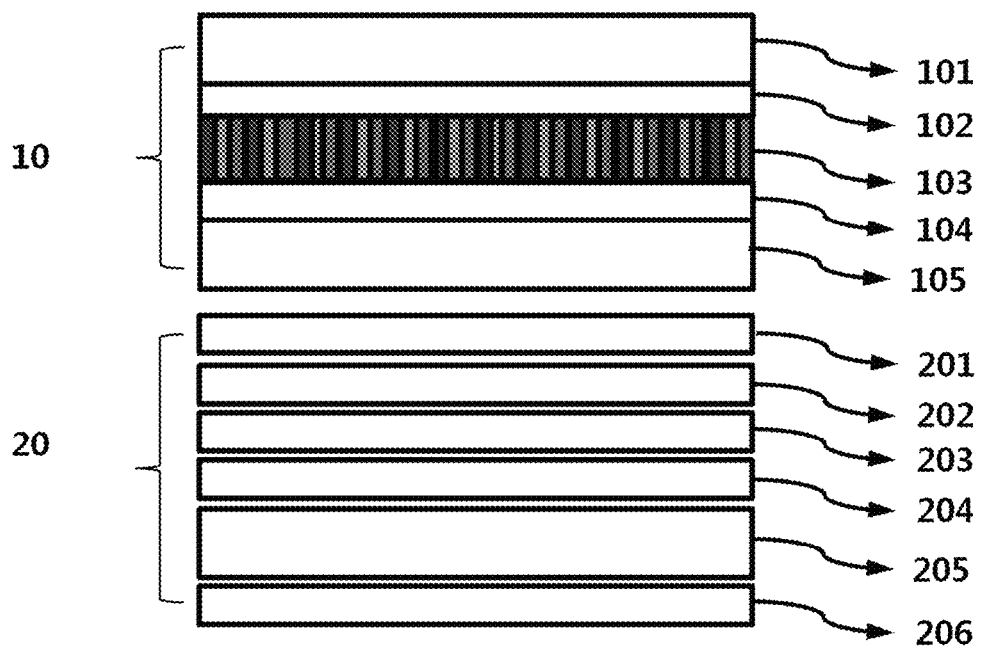
FIG. 1 is a schematic view illustrating a structure of a general liquid crystal display.
Figure 2A:
FIGS. 2A to 2D are schematic views respectively illustrating the structures of a dual brightness enhancement film, a diffusion film, a horizontal prism sheet, and a reflective plate.
Figure 2B:
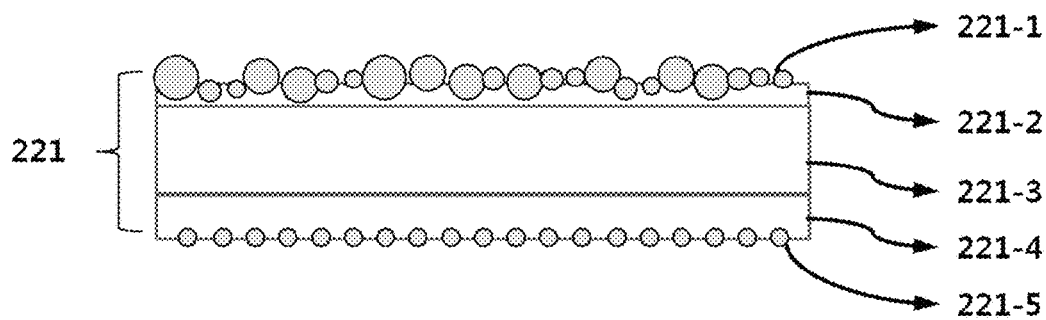
Figure 2C:
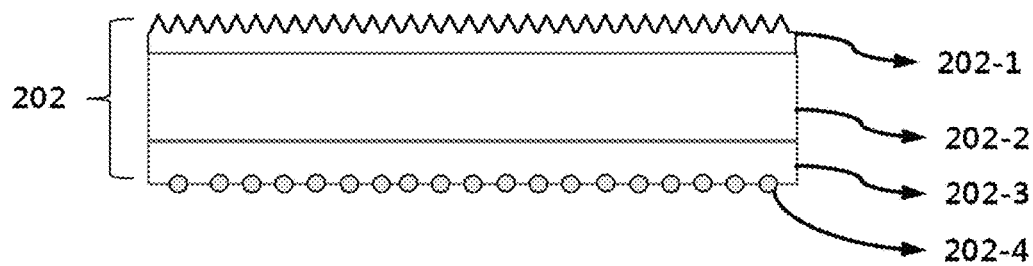
Figure 2D:
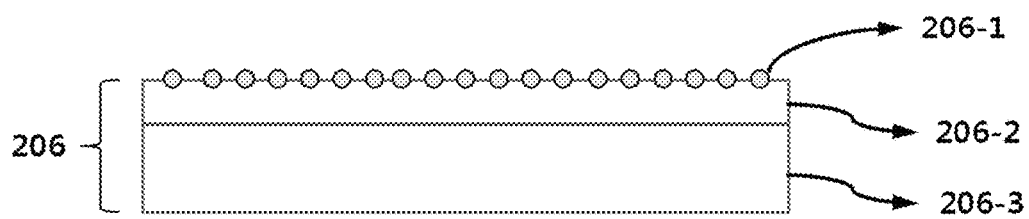

10: liquid crystal panel
101: upper polarizing plate
103: liquid crystal cell
105: lower polarizing plate
201: dual brightness enhancement film (DBEF) or lower diffusion sheet
202: horizontal prism sheet
202-2: prism sheet base
202-4: third beads
204: lower diffusion sheet
206: reflective plate
206-2: front coating layer
211: dual brightness enhancement film
221-1: first beads
221-3: base
221-5: second beads
20: backlight unit
102: first adhesive layer
104: second adhesive layer
202-1: prism pattern layer
202-3: rear coating layer
203: vertical prism sheet
205: light guide plate
206-1: fourth beads
206-3: reflective plate base
221: diffusion film
221-2: diffusion coating layer
221-4: concealing coating layer

DETAILED DESCRIPTION

A liquid crystal display of the present invention includes a backlight unit and a liquid crystal panel, wherein the backlight unit, the liquid crystal panel, or both include one or more coating layers or adhesive layers, wherein the one or more coating layers or adhesive layers include at least one type of an absorption dye configured to absorb a specific wavelength band and at least one type of a fluorescent dye configured to absorb and emit a specific wavelength band, in such a manner that both the absorption dye and the fluorescent dye are included in the same layer, or each of the absorption dye and the fluorescent dye is included in a different layer, respectively, in the one or more coating layers or adhesive layers.

According to the present invention, a combination of at least one type of an absorption dye configured to selectively absorb at least one specific wavelength band and a combination of at least one type of a fluorescent dye configured to absorb and emit a specific wavelength band are introduced into an adhesive layer or a coating layer of the liquid crystal display, by which the color gamut and brightness of a liquid crystal display may be enhanced by improving color gamut by transmitting pure RGB wavelengths from a light source and blocking unnecessary wavelengths other than RGB wavelengths and by compensating brightness decrease that may be accompanied thereby.

A structure of a general liquid crystal display is illustrated in FIG. 1. Referring to FIG. 1, a liquid crystal panel 10 may include an upper polarizing plate 101, a first adhesive layer 102, a liquid crystal cell 103, a second adhesive layer 104, and a lower polarizing plate 105 in a sequentially stacked form, and a backlight unit 20 may sequentially include a dual brightness enhancement film (DBEF) or an upper diffusion sheet 201, a horizontal prism sheet 202, a vertical prism sheet 203, a lower diffusion sheet 204, a light guide plate 205, and a reflective plate 206.

Referring to FIGS. 2A to 2D, the dual brightness enhancement film 211 may have a multilayer structure (not shown in the drawings), and the diffusion sheet 221 which is used as an upper diffusion sheet or a lower diffusion sheet may include a diffusion coating layer 221-2 having first beads 221-1 on one side of a diffusion sheet base 221-3 and a concealing coating layer 221-4 having second beads 221-5 on the opposite side thereof. Furthermore, the horizontal prism sheet 202 may include a prism pattern layer 202-1 on one side of a prism sheet base 202-2 and a rear coating layer 202-3 having third beads 202-4 on an opposite side thereof. In addition, the vertical prism sheet may also have the layer configuration the same as or similar to the horizontal prism sheet 202. Also, the reflective plate 206 may include a front coating layer 206-2 having fourth beads 206-1 on one side of a reflective plate base 206-3.

However, the liquid crystal display of the present invention is not limited to the above-described structure and may encompass diverse modifications, if necessary.

In particular, the backlight unit 20 may include the following laminated structures.

i) upper diffusion sheet/horizontal prism sheet/vertical prism sheet/lower diffusion sheet ii) upper diffusion sheet/horizontal prism sheet/vertical prism sheet iii) dual brightness enhancement film/horizontal prism sheet/vertical prism sheet iv) micro lens film (MLF)/horizontal prism sheet/vertical prism sheet v) upper diffusion sheet/horizontal prism sheet/vertical prism sheet Under the basic principle of a liquid crystal display, while light emitted from a light source is guided toward a liquid crystal panel through a light guide plate and then passes through a light diffusion sheet, the light is diffused in horizontal/vertical directions with respect to the surface thereof. Since the light going out of the light diffusion sheet passes through a prism sheet and is prevented from going in a direction other than a front light exit surface, light directivity is improved to narrow a viewing angle, brightness in a direction of the front light exit surface of backlight is increased. In this case, the increase in the brightness may be maximized through light recycling, if a separate sheet such as a dual brightness enhancement film is used in a backlight unit.

According to the present invention, the backlight unit, the liquid crystal panel, or both include a coating layer or an adhesive layer comprising at least one type of an absorption dye configured to absorb a specific wavelength band and/or a fluorescent dye configured to absorb and emit a specific wavelength band.

For example, the liquid crystal panel may include at least one type of an absorption dye configured to absorb a specific wavelength band and at least one type of a fluorescent dye configured to absorb and emit a specific wavelength band in one of the first adhesive layer or the second adhesive layer, in such a manner that both the absorption dye and the fluorescent dye are included in the same layer, or each of the absorption dye and the fluorescent dye is included in a different layer, respectively, in the first adhesive layer and the second adhesive layer.

In addition, the backlight unit may have a coating layer on at least one of one side or both sides of the dual brightness enhancement film or the upper diffusion sheet, one side or both sides of the horizontal prism sheet, one side or both sides of the vertical prism sheet, one side or both sides of the lower diffusion sheet, and one side of the reflective plate (i.e., the light guide plate facing side), wherein the one or more coating layers include at least one type of an absorption dye configured to absorb a specific wavelength band and at least one type of a fluorescent dye configured to absorb and emit a specific wavelength band in one of the first adhesive layer and the second adhesive layer, in such a manner that both the absorption dye and the fluorescent dye are included in the same layer, or each of the absorption dye and the fluorescent dye is included in a different layer, respectively, in the one or more coating layers.

The adhesive layer or the coating layer including the absorption dye and the fluorescent dye both is referred to as a color gamut enhancing and brightness compensating film, and according to the position of the color gamut enhancing film, particularly, the position of the coating layer, the emission color purity and the brightness loss of a liquid crystal display may vary, and thus, the position thereof may be appropriately controlled according to the need.

In addition, the absorption dye used in the present invention may be a combination of at least one absorption dye which has a main absorption wavelength band other than RGB wavelengths.

For example, the absorption dye used in the present invention may have a main absorption wavelength band of 430 nm or less (e.g., 380 nm to 430 nm), 480 nm to 510 nm, or 560 nm to 600 nm as a wavelength band other than RGB wavelengths, and may be a combination of at least one type of the absorption dye.

Particularly, (i) an absorption dye blocking a wavelength band of 380 nm to 430 nm may include a hydroxybenzotriazole (HB)-based absorption dye, a tris-resorcinol-triazine chromophore (TRTC)-based absorption dye, and a hydroxyphenyl-benzotriazole chromophore (HBC)-based absorption dye; (ii) an absorption dye blocking a wavelength band of 480 nm to 510 nm may include a pyrrole methine (PM)-based absorption dye, a rhodamine (RH)-based absorption dye, and a boron dipyrromethene (BODIBY)-based absorption dye; and (iii) an absorption dye blocking a wavelength band of 560 nm to 600 nm may include a tetraazaporphyrin (TAP)-based absorption dye, a squaraine (SQ)-based absorption dye, and a cyanine (CY)-based absorption dye.

Preferably, a combination of at least two absorption dyes selected from the group consisting of a hydroxybenzotriazole-based absorption dye, a pyrrole methine-based absorption dye, a rhodamine-based absorption dye, a cyanine-based absorption dye, and a tetraazaporphyrin-based absorption dye may be used, and more preferably, a combination of a hydroxybenzotriazole-based absorption dye, a cyanine-based absorption dye, and a tetraazaporphyrin-based absorption dye may be used.

In addition, the fluorescent dye used in the present invention may be a combination of at least one fluorescent dye which has a main absorption wavelength band other than RGB wavelengths and has a main emission wavelength band corresponding to the RGB wavelengths.

For example, the fluorescent dye used in the present invention may have a main absorption wavelength band of 430 nm or less (e.g., 380 nm to 430 nm), 480 nm to 510 nm, or 560 nm to 600 nm other than RGB wavelengths, and a main emission wavelength band of 430 nm to 480 nm, 510 nm to 580 nm, or 600 nm or more (e.g., 600 nm to 650 nm) corresponding to RGB wavelengths, and may be a combination of at least one type of the fluorescent dye.

Particularly, the fluorescent dye may include an anthracene-based fluorescent dye, an anthraquinone-based fluorescent dye, an arylmethine-based fluorescent dye, an azo-based fluorescent dye, an azomethine-based fluorescent dye, a bimane-based fluorescent dye, a coumarin-based fluorescent dye, an 1,5-diazabicyclo[3,3,0]octadiene-based fluorescent dye, a diketo-pyrrole-based fluorescent dye, a naphthalenol-imine-based fluorescent dye, a naphthalimide-based fluorescent dye, a perylene-based fluorescent dye, a phenolphthalein-based fluorescent dye, a pyrrole methine-based fluorescent dye, a pyran-based fluorescent dye, a pyrene-based fluorescent dye, a porphycene-based fluorescent dye, a porphyrin-based fluorescent dye, a quinacridone-based fluorescent dye, a rhodamine-based fluorescent dye, a rubrene-based fluorescent dye, and a stilbene-based fluorescent dye.

Preferably, a combination of at least two fluorescent dyes selected from the group consisting of a perylene-based fluorescent dye, an azo-based fluorescent dye, a pyrrole methine-based fluorescent dye, a pyran-based fluorescent dye, and a coumarin-based fluorescent dye may be used.

More preferably, a combination of the fluorescent dye of the perylene-based fluorescent dye, a pyrrole methine-based fluorescent dye, a pyran-based fluorescent dye, and a coumarin-based fluorescent dye may be used.

Accordingly, the present invention provides a color gamut enhancing and brightness compensating film for a liquid crystal display, wherein the film includes a pressure-sensitive adhesive, at least one type of an absorption dye configured to absorb a specific wavelength band, and at least one type of a fluorescent dye configured to absorb and emit a specific wavelength band. In this case, the color gamut enhancing and brightness compensating film may be provided as an adhesive layer in the liquid crystal display.

In addition, the present invention provides a color gamut enhancing and brightness compensating film for a liquid crystal display, wherein the film includes a binder resin, at least one type of an absorption dye configured to absorb a specific wavelength band, and at least one type of a fluorescent dye configured to absorb and emit a specific wavelength band. In this case, the color gamut enhancing and brightness compensating film may be provided as a coating layer in the liquid crystal display.

The absorption dye may be included in an amount of 0.01 wt % to 10 wt %, and specifically, in an amount of 0.05 wt % to 7 wt %, based on the weight of the color gamut enhancing and brightness compensating film (i.e., an adhesive layer or a coating layer).

In addition, the fluorescent dye may be included in an amount of 0.01 wt % to 10 wt %, and specifically, in an amount of 0.05 wt % to 7 wt %, based on the weight of the color gamut enhancing and brightness compensating film (i.e., an adhesive layer or a coating layer).

In addition, the weight ratio of absorption dye:fluorescent dye in the film may be from 0.1:100 to 100:0.1.

Examples of the pressure-sensitive adhesive used in the adhesive layer (a first adhesive layer and a second adhesive layer) may include at least one adhesive selected from the group consisting of an acryl-based adhesive, a urethane-based adhesive, an epoxy-based adhesive, and a silicone-based adhesive. Specifically, the pressure-sensitive adhesive may be an acryl-based adhesive. For example, the adhesive layer may be formed by being wet coated on the one side or both sides of the upper polarizing plate and the lower polarizing plate, and the thickness of the adhesive layer may be in a range of 2 μm to 100 μm, 5 μm to 100 μm, and preferably, 15 μm to 25 μm.

Examples of the binder resin used in the coating layer may include at least one resin selected from the group consisting of a polyester-based binder resin, an acryl-based binder resin, a polyurethane-based binder resin, a melamine-based binder resin, a polyvinyl alcohol-based binder resin, and an oxazoline-based binder resin. Specifically, the binder resin may be an acryl-based binder resin. For example, the coating layer may be formed by being wet coated on one side or both sides of a dual brightness enhancement film or an upper diffusion sheet, one side or both sides of a horizontal prism sheet, one side or both sides of a vertical prism sheet, one side or both sides of a lower diffusion sheet, and one side of a reflective plate (i.e., light guide plate facing side), and the thickness of the coating layer may be in a range of 1 μm to 100 μm, 2 μm to 100 μm, and preferably, 2 μm to 15 μm.

The adhesive layer and the coating layer may further include an ultraviolet blocking agent for blocking UV light according to the need. The ultraviolet blocking agent absorbs (shields) light having a wavelength of 430 nm or less, and may use, for example, a hydroxybenzotriazole (HB)-based absorption dye, a tris-resorcinol-triazine chromophore (TRTC)-based absorption dye, or a hydroxyphenyl-benzotriazole chromophore (HBC)-based absorption dye alone or as a mixture of two or more thereof. The adhesive layer and the coating layer may include the ultraviolet blocking agent in an amount of 0.01 wt % to 10 wt %, and preferably, 0.05 wt % to 7 wt %, based on the weight of the adhesive layer or the coating layer.

Light transmittance of the color gamut enhancing film according to the present invention may be adjusted according to a brightness range of a liquid crystal display, but, specifically, the color gamut enhancing film may have a visible light transmittance of 30% to 90%, and preferably, 50% to 90%.

Component layers of each of the backlight unit and the liquid crystal panel constituting the liquid crystal display of the present invention may have a material, a thickness, and a shape, which are commonly accepted in the art, and may be diversely modified if necessary.

Thus, the liquid crystal display including the color gamut enhancing and brightness compensating film of the present invention may provide enhanced color gamut and brightness by blocking unnecessary wavelengths other than the RGB wavelengths while transmitting the pure RGB wavelengths emitted from a light source as much as possible, and may maximize a color gamut enhancing effect and brightness compensation effect depending on display characteristics by freely moving the position of the color gamut enhancing and brightness compensating film.

EXAMPLE

Hereinafter, the present invention will be explained in more detail referring to embodiments. The following embodiments are intended to further illustrate the present invention without limiting its scope.

Example 1

35 parts by weight of GS1000 manufactured by Soken as an acryl binder resin, 50 parts by weight of methyl ethyl ketone (MEK) as a solvent, and 15 parts by weight of MX-500 manufactured by Soken as beads were mixed, and an absorption dye, SK-d593 manufactured by SK Chemicals was then added thereto in an amount of 0.1 parts by weight based on 100 parts by weight of the mixture to prepare an absorption dye-containing coating composition. One surface of a diffusion film was coated with the absorption dye-containing coating composition using a Mayer bar and dried and cured to form a 5 μm thick concealing coating layer containing the absorption dye.

Meanwhile, 35 parts by weight of GS1000 manufactured by Soken as an acryl binder resin, 50 parts by weight of methyl ethyl ketone (MEK) as a solvent, and 15 parts by weight of MX-1000 manufactured by Soken as beads were mixed, and a fluorescent dye, FL560 manufactured by SK Chemicals was then added thereto in an amount of 0.1 parts by weight based on 100 parts by weight of the mixture to prepare a fluorescent dye-containing coating composition. The opposite surface of the diffusion film on which the concealing coating layer was formed, was coated with the fluorescent dye-containing coating composition using a Mayer bar and dried and cured to form a 15 μm thick diffusion coating layer containing the fluorescent dye.

Figure 3A:
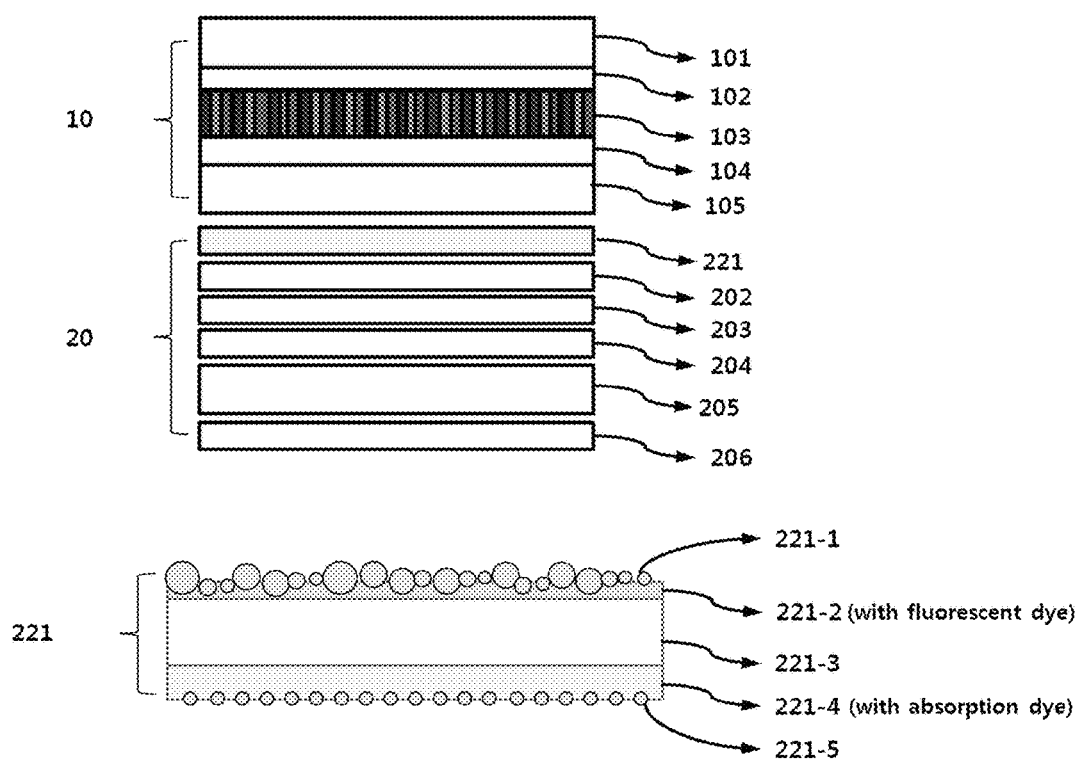
FIGS. 3A to 3E respectively illustrate the structures of liquid crystal displays according to Examples 1 and 2, and Comparative Examples 1 to 3.

The diffusion film thus obtained was introduced as an upper diffusion sheet in a commercially available liquid crystal display so that the concealing coating layer faced a horizontal prism sheet to manufacture a liquid crystal display of the present invention (see FIG. 3A).

Example 2

An absorption dye-containing coating composition was prepared by the same method described in Example 1, and a concealing coating layer containing the absorption dye was formed on one surface of a diffusion film. On the opposite surface of the diffusion film on which the concealing coating layer was formed, a diffusion coating layer was formed by the same method described in Example 1, except that excluding the fluorescent dye was not included in the diffusion coating layer.

In addition, a fluorescent dye-containing coating composition was prepared by the same method described in Example 1, and the fluorescent dye-containing coating composition was coated on the surface of a horizontal prism sheet where a prism was not formed by using a Mayer bar and dried and cured to form a 5 μm thick rear coating layer containing the fluorescent dye.

Figure 3B:
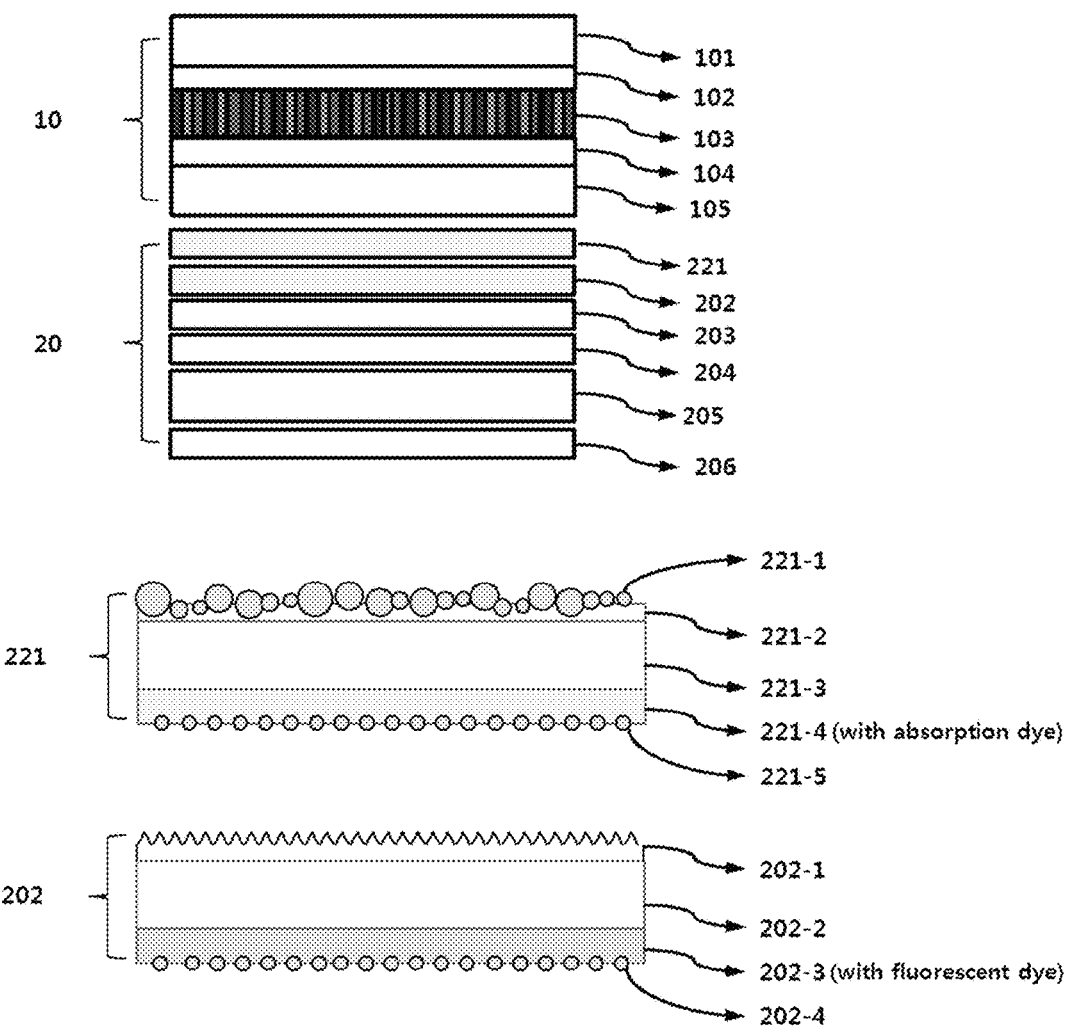

The diffusion film thus obtained was introduced as an upper diffusion sheet, and the horizontal prism sheet thus obtained was used in a commercially available liquid crystal display so that the concealing coating layer of the diffusion film faced the horizontal prism sheet, and the rear coating layer of the horizontal prism sheet faced a vertical prism sheet to manufacture a liquid crystal display of the present invention (see FIG. 3B).

Comparative Example 1

A diffusion coating layer and a concealing coating layer were formed on a diffusion film by performing the same procedure described in Example 1, except that none of the absorption dye and the fluorescent dye were included in the diffusion coating layer and the concealing coating layer.

Figure 3C:
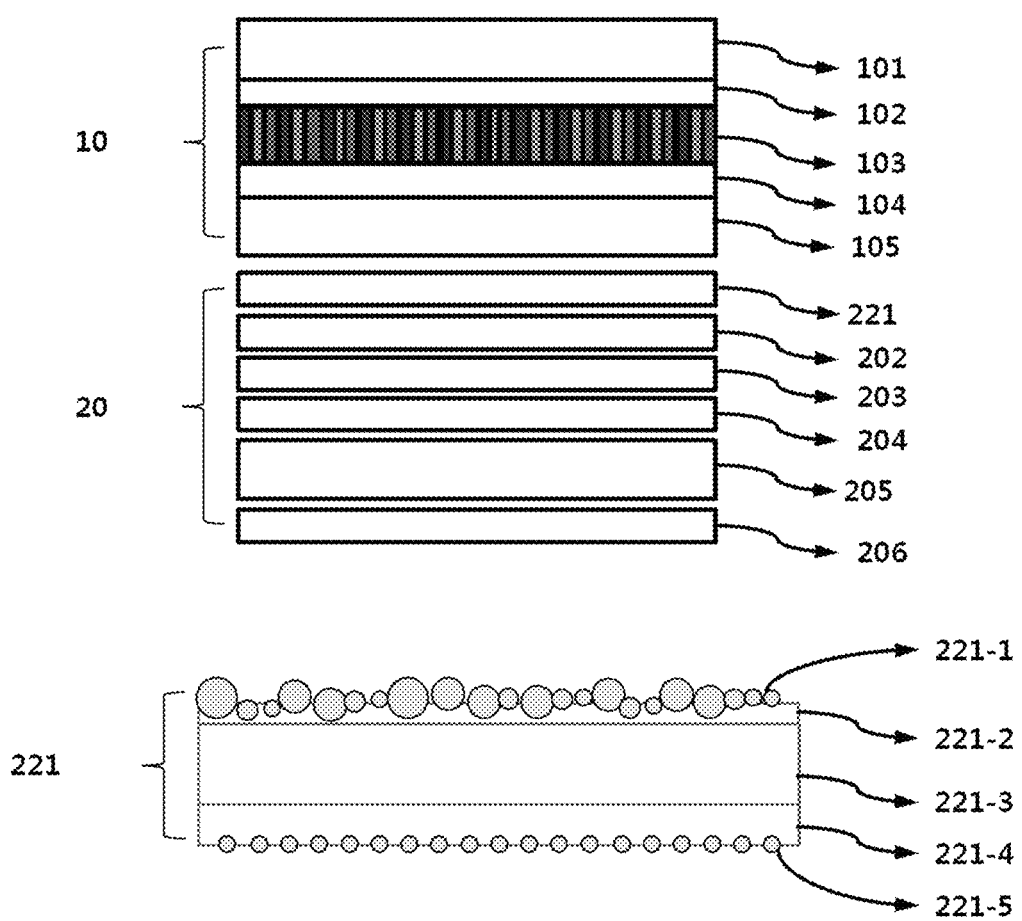

The diffusion film thus obtained was introduced as an upper diffusion sheet in a commercially available liquid crystal display so that the concealing coating layer faced a horizontal prism sheet to manufacture a comparative liquid crystal display (see FIG. 3C).

Comparative Example 2

An absorption dye-containing coating composition was prepared, and a concealing coating layer containing the absorption dye was formed on one surface of a diffusion film by performing the same procedure described in Example 1. On the opposite surface of the diffusion film on which the concealing coating layer was formed, a diffusion coating layer was formed by performing the same procedure described in Example 1, except that a fluorescent dye was not included in the diffusion coating layer.

Figure 3D:
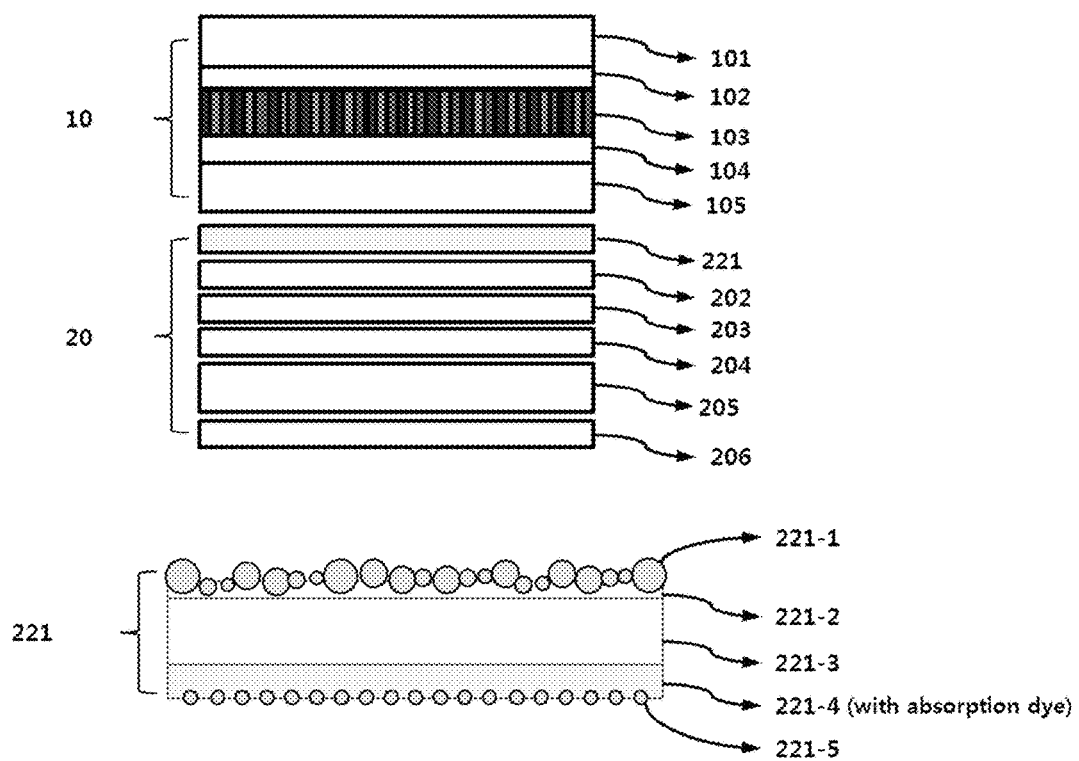

The diffusion film thus obtained was introduced as an upper diffusion sheet in a commercially available liquid crystal display so that the concealing coating layer faced a horizontal prism sheet to manufacture a comparative liquid crystal display (see FIG. 3D).

Comparative Example 3

A fluorescent dye-containing coating composition was prepared, and a diffusion coating layer containing the fluorescent dye was formed on one surface of a diffusion film by performing the same procedure described in Example 1. On the opposite surface of the diffusion film on which the diffusion coating layer was formed, a concealing coating layer was formed by performing the same procedure described in Example 1, except that an absorption dye was not included in the concealing coating layer.

Figure 3E:
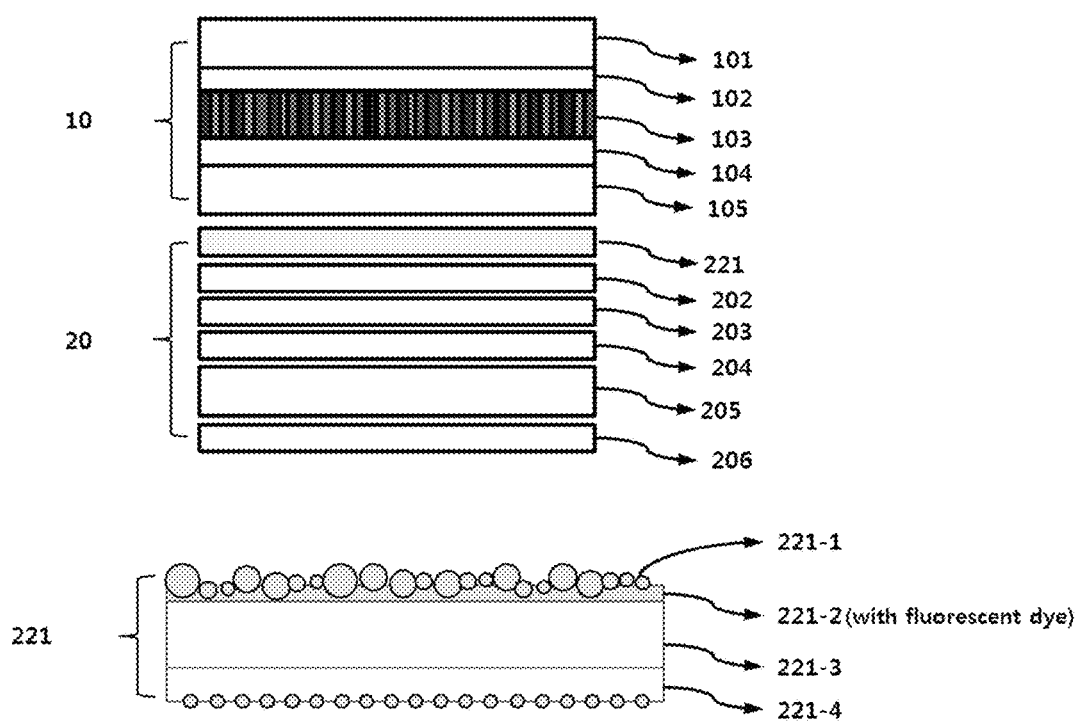
Figure 4A:
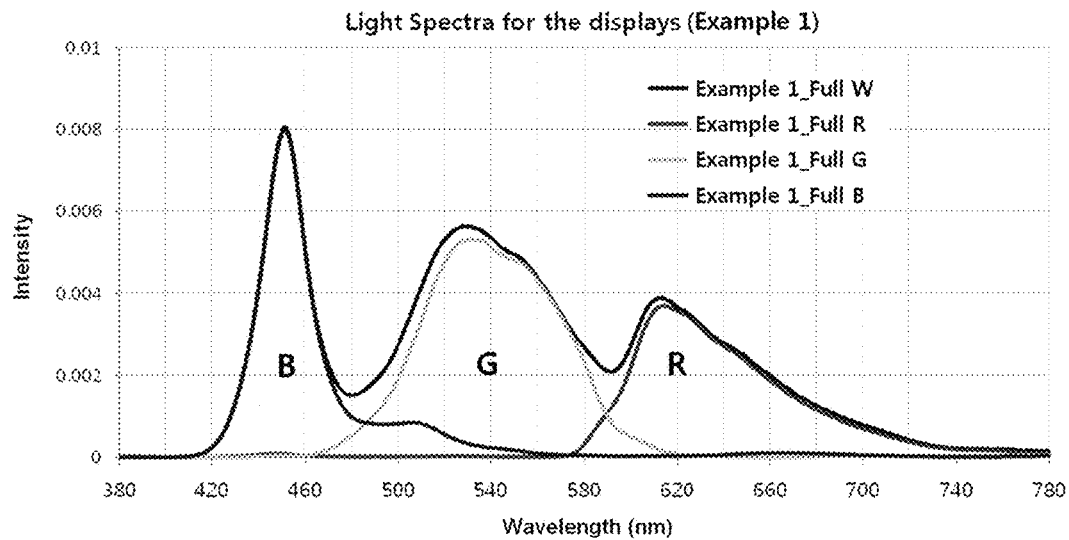
FIGS. 4A to 4E respectively illustrate the emission intensity change of liquid crystal displays according to Examples 1 and 2 and Comparative Examples 1 to 3.
Figure 4B:
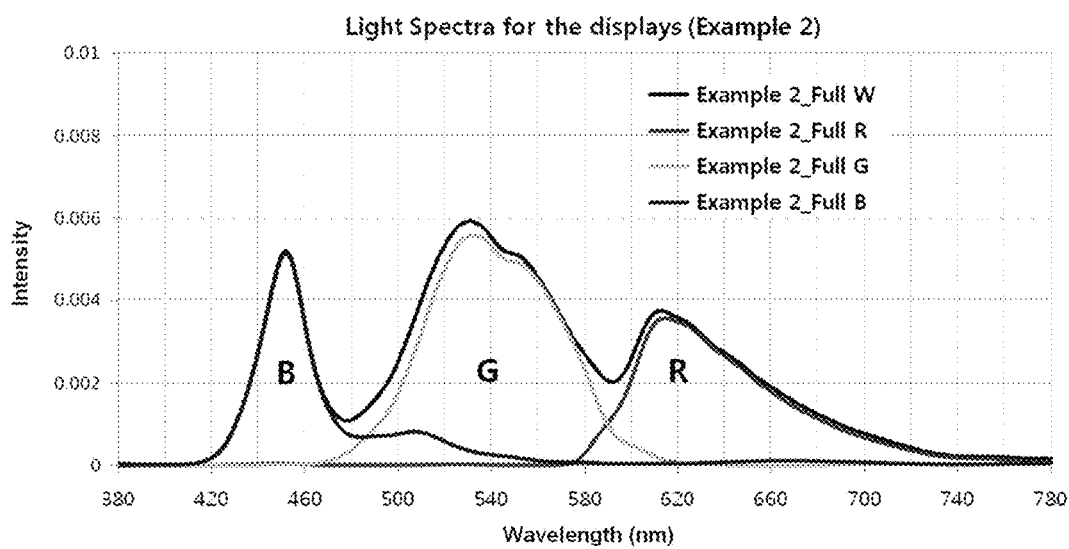
Figure 4C:
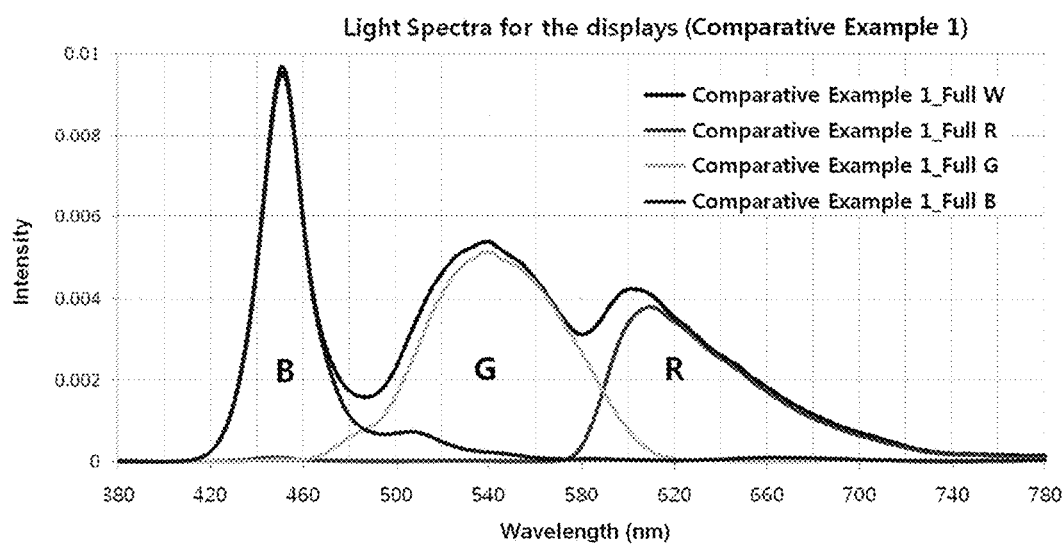
Figure 4D:
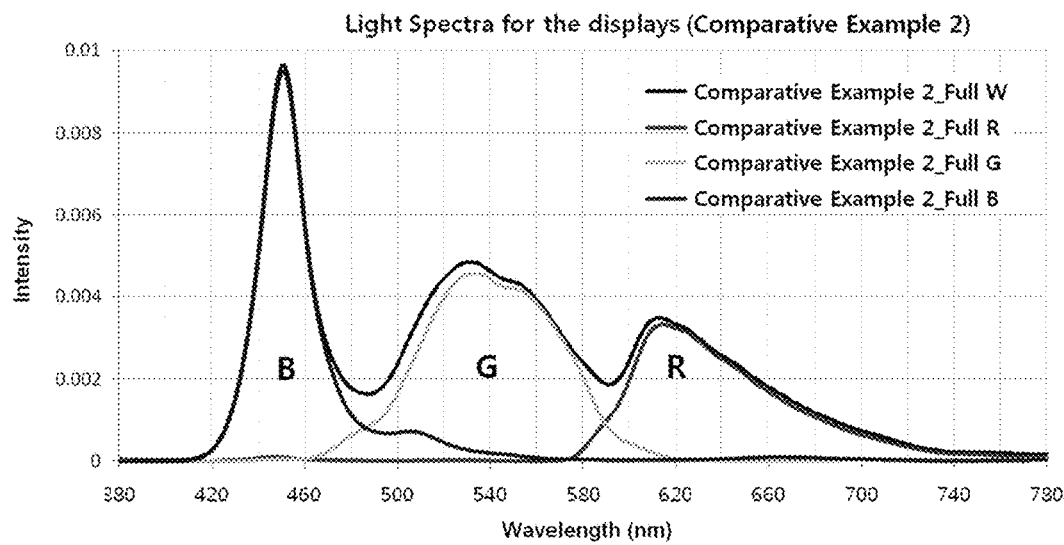
Figure 4E:
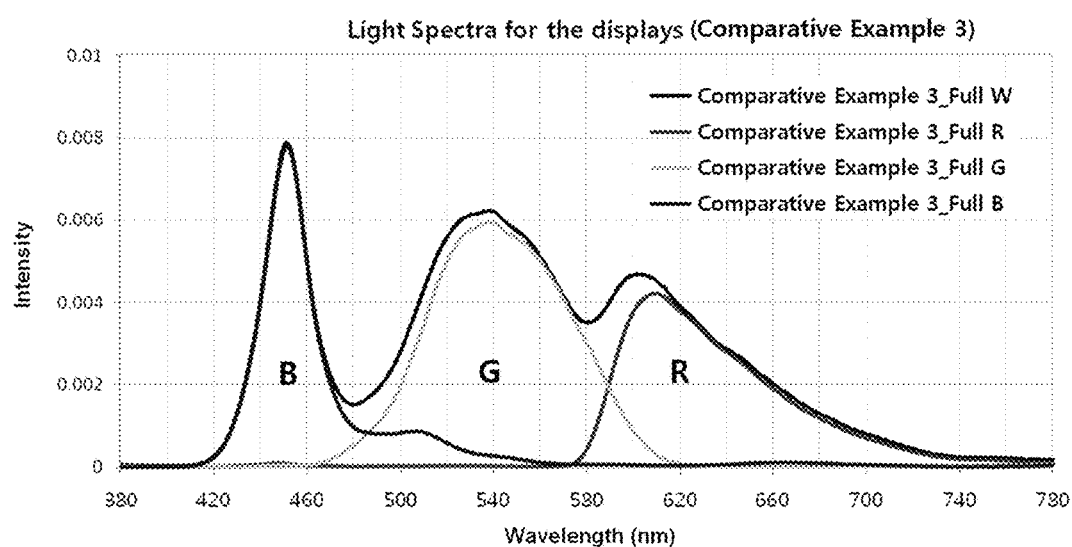

The diffusion film thus obtained was introduced as an upper diffusion sheet in a commercially available liquid crystal display so that the concealing coating layer faced a horizontal prism sheet to manufacture a comparative liquid crystal display (see FIG. 3E).

Experimental Example

Characteristics and changes in spectrum were measured for the liquid crystal displays manufactured in the examples and comparative examples by using a radiometer (CS-2000, Minolta Co., Ltd.) and the results thereof are presented in Table 1 below and FIGS. 4A to 4E. In the following Table 1, a color gamut indicates a color reproduction area.

TABLE 1

|  |  | Example 1 | Example 2 | Comparative Example 1 | Comparative Example 2 | Comparative Example 3 |
|---|---|---|---|---|---|---|
| Relative brightness ratio |  | 96.3% | 96.2% | 100.0% | 85.1% | 113.3% |
| Full W | Lv | 285.7 | 296.7 | 252.6 | 285.4 | 336.1 |
|  | x | 0.3087 | 0.3150 | 0.2933 | 0.3289 | 0.3307 |
|  | y | 0.3560 | 0.3347 | 0.3164 | 0.4077 | 0.3748 |
| Full R | Lv | 52.0 | 61.3 | 46.6 | 50.2 | 67.7 |
|  | x | 0.6512 | 0.6417 | 0.6481 | 0.6543 | 0.6440 |
|  | y | 0.3291 | 0.3381 | 0.3264 | 0.3314 | 0.3404 |
| Full G | Lv | 212.5 | 213.4 | 184.6 | 216.0 | 245.8 |
|  | x | 0.2921 | 0.3121 | 0.2936 | 0.2933 | 0.3098 |
|  | y | 0.6406 | 0.6250 | 0.6339 | 0.6475 | 0.6314 |
| Full B | Lv | 22.8 | 23.1 | 22.0 | 20.1 | 24.0 |
|  | x | 0.1552 | 0.1561 | 0.1546 | 0.1569 | 0.1569 |
|  | y | 0.0719 | 0.0631 | 0.0601 | 0.0925 | 0.0768 |
| Color gamut | Color gamut | 0.123 | 0.115 | 0.123 | 0.122 | 0.115 |
|  | Against NTSC | 78.0% | 72.7% | 77.8% | 77.0% | 72.6% |
|  | Against DCI | 81.2% | 75.6% | 81.0% | 80.1% | 75.6% |
| Transmittance loss (T % loss) |  | −3.7% | −3.8% | — | −14.9% | +13.3% |

As shown in Table 1 above and FIGS. 4A to 4E, it may be understood that the liquid crystal displays of the examples including the color gamut enhancing and brightness compensating film according to the present invention provide improved color gamut and color purity, while exhibiting excellent brightness.

What is claimed is:

1. A liquid crystal display comprising a backlight unit and a liquid crystal panel,
wherein the liquid crystal panel sequentially comprises an upper polarizing plate, a first adhesive layer, a liquid crystal cell, a second adhesive layer, and a lower polarizing plate, and
the first adhesive layer and the second adhesive layer comprise at least one type of an absorption dye configured to absorb a specific wavelength band and at least one type of a fluorescent dye configured to absorb and emit a specific wavelength band, in such a manner that both the absorption dye and the fluorescent dye are comprised in the same layer, or each of the absorption dye and the fluorescent dye is comprised in a different layer, respectively, in the first adhesive layer and the second adhesive layer,
wherein the at least one type of the absorption dye is a combination of a hydroxybenzotriazole-based absorption dye, a cyanine-based absorption dye and a tetraazaporphyrin-based absorption dye, and
the at least one type of the fluorescent dye is a combination of a perylene-based fluorescent dye, a pyrrole methine-based fluorescent dye, a pyran-based fluorescent dye, and a coumarin-based fluorescent dye.

2. The liquid crystal display of claim 1, wherein the absorption dye has a main absorption wavelength band other than RGB wavelengths, and
the fluorescent dye has a main absorption wavelength band other than RGB wavelengths and a main emission wavelength band corresponding to the RGB wavelengths.

3. The liquid crystal display of claim 1, wherein the absorption dye has a main absorption wavelength band of 380 to 430 nm, 480 to 510 nm, or 560 to 600 nm, and the fluorescent dye has a main absorption wavelength band of 380 to 430 nm, 480 to 510 nm, or 560 to 600 nm, and a main emission wavelength band of 430 to 480 nm, 510 to 580 nm, or 600 to 650 nm.

4. The liquid crystal display of claim 1, wherein the absorption dye is included in an amount of 0.01 wt % to 10 wt % based on a total weight of a coating layer or each adhesive layer, and
the fluorescent dye is included in an amount of 0.01 wt % to 10 wt % based on a total weight of the coating layer or each adhesive layer.

5. The liquid crystal display of claim 1, wherein a coating layer or each adhesive layer has a thickness of 2 to 100 μm.

6. A liquid crystal display comprising a backlight unit and a liquid crystal panel,
wherein the liquid crystal panel sequentially comprises an upper polarizing plate, a first adhesive layer, a liquid crystal cell, a second adhesive layer, and a lower polarizing plate, and
the first adhesive layer and the second adhesive layer comprise at least one type of an absorption dye configured to absorb a specific wavelength band and at least one type of a fluorescent dye configured to absorb and emit a specific wavelength band, in such a manner that both the absorption dye and the fluorescent dye are comprised in the same layer, or each of the absorption dye and the fluorescent dye is comprised in a different layer, respectively, in the first adhesive layer and the second adhesive layer, wherein the backlight unit sequentially comprises a dual brightness enhancement film (DBEF) or an upper diffusion sheet, a horizontal prism sheet, a vertical prism sheet, a lower diffusion sheet, a light guide plate, and a reflective plate, wherein the backlight unit has a coating layer on at least one of one side or both sides of the dual brightness enhancement film or the upper diffusion sheet, one side or both sides of the horizontal prism sheet, one side or both sides of the vertical prism sheet, one side or both sides of the lower diffusion sheet, and one side of the reflective plate, and the coating layers comprise at least one type of an absorption dye configured to absorb a specific wavelength band and at least one type of a fluorescent dye configured to absorb and emit a specific wavelength band, in such a manner that both the absorption dye and the fluorescent dye are comprised in the same layer, or each of the absorption dye and the fluorescent dye is comprised in a different layer, respectively, in the coating layers.

7. A color gamut enhancing and brightness compensating film for a liquid crystal display, comprising:

a pressure-sensitive adhesive;

at least one type of an absorption dye configured to absorb a specific wavelength band; and at least one type of a fluorescent dye configured to absorb and emit a specific wavelength band, wherein the at least one type of the absorption dye is a combination of a hydroxybenzotriazole-based absorption dye, a cyanine-based absorption dye and a tetraazaporphyrin-based absorption dye, and the at least one type of the fluorescent dye is a combination of a perylene-based fluorescent dye, a pyrrole methine-based fluorescent dye, a pyran-based fluorescent dye, and a coumarin-based fluorescent dye.

8. A color gamut enhancing and brightness compensating film for a liquid crystal display, comprising:

a binder resin selected from the group consisting of a polyester-based binder resin, an acryl-based binder resin, a polyurethane-based binder resin, a melamine-based binder resin, a polyvinyl alcohol-based binder resin, an oxazoline-based binder resin, and combinations thereof;

at least one type of an absorption dye configured to absorb a specific wavelength band, wherein the absorption dye is not an ultraviolet blocking agent; and at least one type of a fluorescent dye configured to absorb and emit a specific wavelength band, wherein the at least one type of the absorption dye is a combination of a hydroxybenzotriazole-based absorption dye, a cyanine-based absorption dye and a tetraazaporphyrin-based absorption dye, and the at least one type of the fluorescent dye is a combination of a perylene-based fluorescent dye, a pyrrole methine-based fluorescent dye, a pyran-based fluorescent dye, and a coumarin-based fluorescent dye.

\* \* \* \* \*